United States Patent
Kouremetis et al.

(10) Patent No.: US 12,199,834 B2
(45) Date of Patent: Jan. 14, 2025

(54) SYSTEMS AND METHODS FOR GENERATING COMPUTING NETWORK INFRASTRUCTURE FROM NATURAL-LANGUAGE DESCRIPTIONS

(71) Applicant: The MITRE Corporation, McLean, VA (US)

(72) Inventors: Michael Bastian Kouremetis, Fairfax, VA (US); Christopher David Jellen, Seattle, WA (US); William Bryan Booth, Washington, DC (US); Andrew Fred Applebaum, Scottsdale, AZ (US)

(73) Assignee: The MITRE Corporation, McLean, VA (US)

( * ) Notice: Subject to any disclaimer, the term of this patent is extended or adjusted under 35 U.S.C. 154(b) by 266 days.

(21) Appl. No.: 17/969,389

(22) Filed: Oct. 19, 2022

(65) Prior Publication Data

US 2024/0137283 A1 Apr. 25, 2024
US 2024/0235948 A9 Jul. 11, 2024

(51) Int. Cl.
*H04L 41/14* (2022.01)
*G06F 40/295* (2020.01)
*G06F 40/40* (2020.01)

(52) U.S. Cl.
CPC .......... *H04L 41/145* (2013.01); *G06F 40/295* (2020.01); *G06F 40/40* (2020.01)

(58) Field of Classification Search
None
See application file for complete search history.

(56) References Cited

U.S. PATENT DOCUMENTS

| 10,735,438 B2 | 8/2020 | Addepalli et al. |
| 10,970,188 B1 | 4/2021 | Åvist et al. |

(Continued)

FOREIGN PATENT DOCUMENTS

| CN | 112800427 A | 5/2021 | |
| CN | 113542262 A | 10/2021 | |
| WO | WO-2021108679 A1 * | 6/2021 | ........... G06F 16/288 |

OTHER PUBLICATIONS

Ahmed et al. "Cyber Attack Detection Method Based on NLP and Ensemble Learning Approach", 23rd International Conference on Computer and Information Technology (ICCIT), Dec. 19-21, 2020; 6 pages.

(Continued)

*Primary Examiner* — Phyllis A Book
(74) *Attorney, Agent, or Firm* — Morrison & Foerster LLP

(57) ABSTRACT

Described herein are systems and methods for generating a computing network from natural language descriptions of the computing network are provided. In one or more examples, the systems and methods described below can be used harvest publically available (or even privately available) natural language descriptions of a computing network, and convert those descriptions into an operational replica of the described computing network. By harvesting both publically available data, as well as other resources, the systems and methods described herein can allow for an analyst tasked with analyzing a given computing network to generate a fully operational replica of the computing network without having to have direct access to the network. In one or more examples, the analyst can recreate a fully-functional replica of the network to be analyzed based on partial descriptions of the computing network, thereby greatly improving the level of analysis capable of being performed.

33 Claims, 6 Drawing Sheets

(56) References Cited

U.S. PATENT DOCUMENTS

| | | | | |
|---|---|---|---|---|
| 11,640,494 | B1* | 5/2023 | Estes | G06F 40/211 |
| | | | | 704/9 |
| 2017/0213157 | A1* | 7/2017 | Bugay | G06F 40/30 |
| 2018/0095962 | A1* | 4/2018 | Anderson | G06F 16/2365 |
| 2018/0349342 | A1* | 12/2018 | Bull | G06F 40/279 |
| 2019/0243831 | A1* | 8/2019 | Rumiantsau | G10L 15/26 |
| 2019/0286676 | A1* | 9/2019 | Fatzinger | G06F 40/56 |
| 2020/0090033 | A1* | 3/2020 | Ramachandran | |
| | | | | G06F 16/24522 |
| 2021/0056164 | A1* | 2/2021 | Mustafi | G06F 16/94 |
| 2021/0174014 | A1* | 6/2021 | Ross | G06F 16/345 |
| 2021/0234871 | A1 | 7/2021 | Togari et al. | |
| 2021/0273959 | A1 | 9/2021 | Salji | |
| 2021/0357409 | A1* | 11/2021 | Rodriguez | G06F 16/24553 |
| 2021/0397626 | A1 | 12/2021 | Griffith et al. | |
| 2021/0409449 | A1 | 12/2021 | Crabtree et al. | |
| 2022/0092096 | A1* | 3/2022 | Yuan | G06F 40/295 |
| 2023/0004830 | A1* | 1/2023 | Arevalo | G06N 3/0464 |
| 2023/0038529 | A1* | 2/2023 | Gutta | G06F 40/186 |
| 2023/0103834 | A1* | 4/2023 | Jeong | G06F 40/242 |
| | | | | 704/9 |
| 2023/0237512 | A1* | 7/2023 | Kaur | G06F 40/279 |
| | | | | 705/7.29 |
| 2023/0325776 | A1* | 10/2023 | Alda | G06Q 10/1053 |
| | | | | 705/321 |

OTHER PUBLICATIONS

Morris et al. (Oct. 2020). "TextAttack: A Framework for Adversarial Attacks, Data Augmentation, and Adversarial Training in NLP", 15 pages.

\* cited by examiner

SYSTEMS AND METHODS FOR GENERATING COMPUTING NETWORK INFRASTRUCTURE FROM NATURAL-LANGUAGE DESCRIPTIONS

FIELD OF THE DISCLOSURE

This disclosure relates to modeling and generating operational computing networks based on natural language descriptions of computing infrastructure.

BACKGROUND OF THE DISCLOSURE

There is no substitute for understanding a cyber-adversary's computing network and capabilities than to perform an analysis on the adversary's operational cyber-infrastructure itself. However, gaining access to an adversary's cyber-infrastructure is often not practical or feasible since the adversary generally has protection and security mechanisms in place that prevent access to the computing network from non-authorized parties. In many cases, the next best option can be to replicate an adversary's computing network so that analyses can be performed on the replica network to discover various attack paths (i.e., to disrupt the network), to perform malware research and analysis, and develop offensive capabilities in a cyber-warfare context.

However, building accurate replicas of an adversary's computing infrastructure can be challenging without direct access to the adversary's computing environment. Often times, an analyst's information about the cyber-infrastructure of an adversary can only be gleaned from mere descriptions of the adversary's computing infrastructure such as through blog posts, informal/unstructured system descriptions, publically available documentation, etc. However, even these available descriptions by themselves may not allow for an analyst to build an operational replica of an adversary's computing infrastructure/network. Replicating an adversary's computing infrastructure, often times requires detailed information about the infrastructure that is not usually available in the descriptions of computing infrastructure available to an analyst.

In some cases, the missing details required to build operational replicas of an adversary's computing network/infrastructure can be filled in by leveraging information about the specific context in which the adversary is operating in, and institutional knowledge regarding cyber-network architectures. However, this body of knowledge is often complex and voluminous making it often impractical to leverage by the analyst alone, since it would require an analyst to parse through large volumes of data to search for information that could help to fill in the gaps left by publically available descriptions of an adversary's computing infrastructure. In addition, the amount of time and human effort required to do so would make the process infeasible.

What is needed is a system that can automatically leverage natural language descriptions of computing infrastructure as well as additional knowledge from a large set of disparate source to generate an operational replica of an adversary's computing system.

SUMMARY OF THE DISCLOSURE

Accordingly, systems and methods for generating a computing network from natural language descriptions of the computing network are provided. In one or more examples, the systems and methods described below can be used to harvest publically available (or even privately available) natural language descriptions of a computing network, and convert those descriptions into an operational replica of the described computing network. In one or more examples, the operational replica can be used to acquire further knowledge about the computing network such as vulnerabilities and capabilities. By harvesting both publically available data, as well as other resources (described in detail below), the systems and methods described herein can allow for an analyst tasked with analyzing a given computing network to generate a fully operational replica of the computing network without having to have direct access to the network. In one or more examples, the analyst can recreate a fully-functional replica of the network to be analyzed based on partial descriptions of the computing network that maybe publically available, thereby greatly improving the level of analysis capable of being performed.

In one or more examples, the systems and methods described herein can include receiving one or more descriptions of a computing network that can be harvested from various publically available or open sources such as the internet, blog posts, social media, publically available manuals, etc. In one or more examples, the sources can be ingested by the system in a variety of computer readable formats including hyper-text markup language (HTML), portable document format (PDF) files, image files, or other word processing formats. In one or more examples, once the descriptions have been received, the system and methods described herein can apply one or more natural language processors to the received descriptions in order to extract one or more entities (i.e., elements) of the computing network, configuration information concerning the one or more extracted entities, and relationship information concerning the extracted entities. In one or more examples, the natural language processors can include a Named Entity Recognition (NER) processor that can be implemented as a supervised deep learning machine model that is trained to identify one or more specific entities from a textual description of a computing network. In one or more examples, the natural language processors can include a pattern recognition natural language processor that is configured to recognize one or more specific patterns within a textual description.

In one or more examples, once the received textual descriptions have been processed using the one or more natural language processors, an initial report outlining the implementation details of the computing network to be replicated can be created using the extracted entities and configuration information obtained from the natural language processing of the received textual descriptions. In one or more examples, once an initial report is generated, the report can be "enriched" by applying one or more processes to the initial report and the underlying information used to generate the report, to fill out additional information that will allow for the report to be converted into an operational replica of the target computing system. In one or more examples, and as described in detail below, enriching the report/data can include applying a "software co-exist" algorithm to the generated report. In one or more examples, the software co-exist algorithm can include cross-referencing one or more of the extracted entities that identifies software with a database of software that is known to more than likely also be present based on previously gathered relationships between software applications.

In one or more examples, the enrichment of the reports can include applying a "textual nearest neighbors" algorithm that is configured to analyze text that appears around a named entity identified by the natural language processor to determine further information about the named entity such as configuration data, software versions, and other information that can be used to provide more details about an extracted entity listed in the report. In one or more examples, the systems and methods disclosed herein can also employ a "common vulnerability enumeration" (CVE) identification algorithm that can use the extracted and/or derived entities found in a particular report, and identify any possible vulnerabilities associated with the entities.

In one or more examples, once the report has been enriched with further information, the enriched report can be exported and converted into an operational computing system. In one or more examples, generating the operational computing system from the report can include generating one or more cloud-based computing instances that is generated using the exported report.

DETAILED DESCRIPTION OF THE DISCLOSURE

Figure 1:
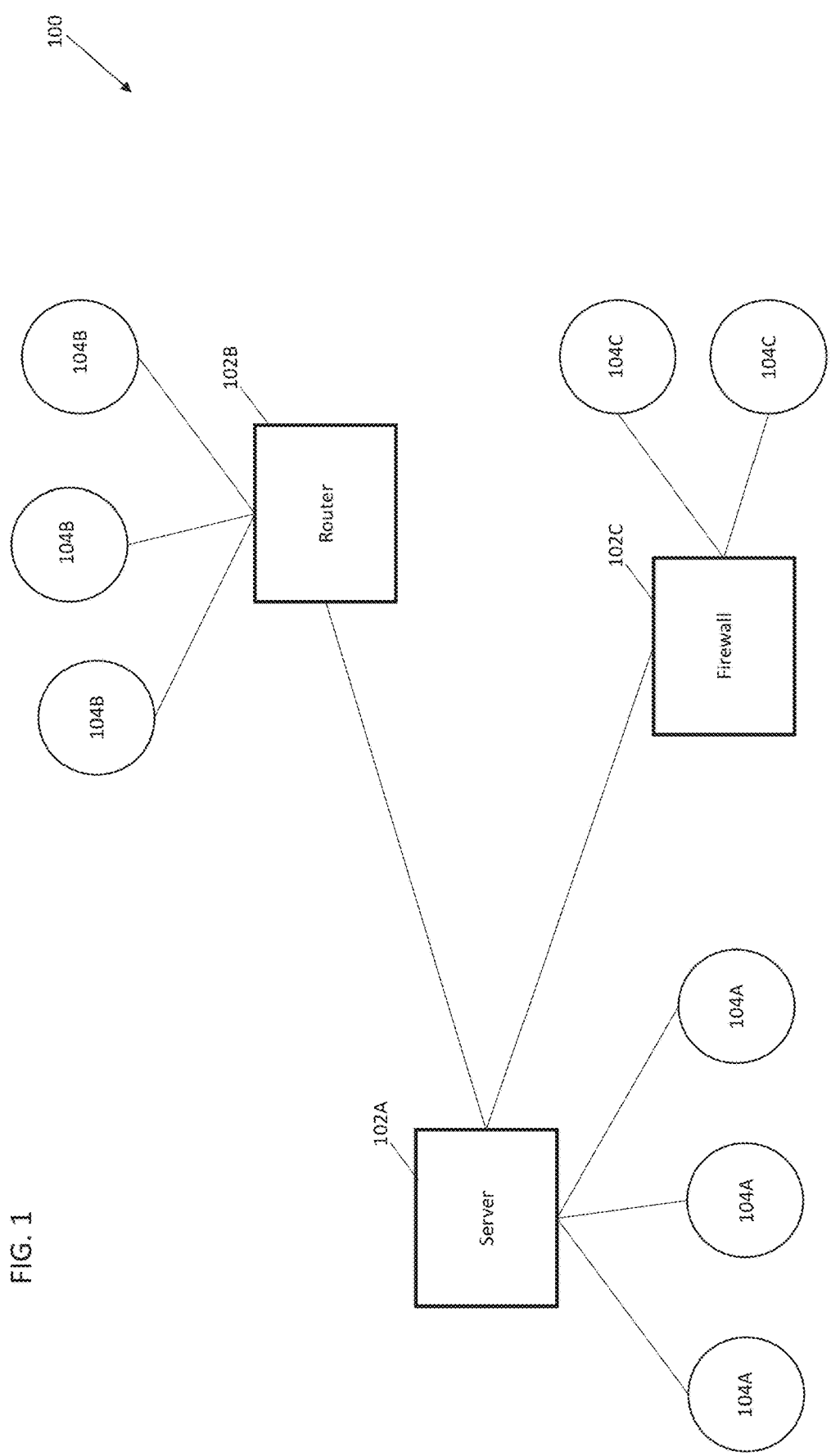
FIG. 1 illustrates an exemplary computing network according to examples of the disclosure.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means by those skilled in the data processing arts to convey the substance of their work most effectively to others skilled in the art. The algorithm here is generally conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of an algorithm. It should be noted that the process steps and instructions of the present disclosure could be embodied in software, firmware, or hardware, and, when embodied in software, they could be downloaded to reside on and be operated from different platforms used by a variety of operating systems.

The present disclosure also relates to a device for performing the operations herein. This device may be specially constructed for the required purpose or it may comprise a general-purpose computer selectively activated or reconfigured by a computer program stored in the computer. Such a computer program may be stored in a non-transitory, computer-readable storage medium such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

Building an operational replica of a computing system, in one or more examples, requires knowledge of the entities that make up the computing system, configuration information about those entities, and relationship information about how the entities of the computing system are related/connected to one another. Without this information, it may be difficult to replicate a computing network for the purposes of studying it, building attack plans to disrupt the computing network, as well as study various malware applications that can be used to disrupt the network. As described in detail below, a complete operational replica of a computing system can require not only information about the computing resources of the network, but also information about how those resources are interconnected with one another as well as information about how information or data is transmitted across the network amongst the various entities.

FIG. 1 illustrates an exemplary computing network according to examples of the disclosure. In one or more examples, the computing network 100 of FIG. 1 can represent an operational replica model of a computing network that can be used to build an actual working computing network using either physical hardware and/or cloud-based hardware. In one or more examples, the computing network 100 of FIG. 1 can include a plurality of computing entities. For instance, network 100 can include one or more gateway components 102A-C that can provide one or more computing resources 104A-C access to the network. In one or more examples, gateway components can include a server 102A, a router 102B, and/or a firewall 102C. In one or more examples, each of the gateway components 102A-C can provide network access to one or more computing resources 104A-C. In one or more examples, the one or more computing resources 104A-C can represent client machines and/or end-user computing resources in the computing, that each utilize a gateway 102A-C to access other computing resources on the network.

In one or more examples, computing resources 104A can utilize server 102A to access the network and pass information or data to one or more other computing resources (104B-C) that are also connected to computing resources 104A via the network 100. In one or more examples, computing resources 104B can utilize router 102B to access the network and pass information or data to one or more other computing resources (104A an 104C) that are also connected to computing resources 104B via the network 100. In one or more examples, computing resources 104C can utilize firewall 102C to access the network and pass information or data to one or more other computing resources (104A-B) that are also connected to computing resources 104C via the network 100.

In one or more example, the model network 100 can include configuration information about each of the computing entities 102A-C and 104A-C. For instance, in one or more examples, the model of network 100 can include information about the various operating systems and other software applications that are implemented on each of the computing entities 102A-C and 104A-C. In one or more examples, in addition to the identification of the entities, as well as configuration information pertaining to entity (such as operating systems and software applications), the model of network 100 can include connectivity information that describes how each of entities of the network are interconnected with one another.

As described above, the information to build an operational replica or model of computing network 100 described above may not be readily available. Absent direct access to the real network itself, getting information about the entities, how the entities are connected, and configuration information for each of the entities may be difficult. However, oftentimes direct or even indirect access to a computing network may not be possible. Even if such access were possible, the level of access still may not be sufficient to yield the type of information that would be needed to build an operational model/replica of the network for the purposes developing attack vectors (i.e., determining vulnerabilities) that could interrupt/disrupt the network's operations.

In many instances, rather than having any access (direct/indirect) to the network itself, information regarding the network may nonetheless be obtained through "open-source" means. For instance, while access to the network itself may not be possible, textual descriptions of the network may exist publically such as in the form of instruction manuals, blog posts, social media posts, internet web sites, etc. In one or more examples, while the various open-source descriptions of the network either individually or collectively may not completely provide the information needed to build a replica computing system, however the information extracted from the open source intelligence can be combined with other information to fill out a complete picture of the network that can be used to develop an operational replica of the network. In one or more examples, in addition to textual information, other information such as images or audio information about a network harvested from publically available sources can also be used to generate an operational replica of a computing network.

Figure 2:
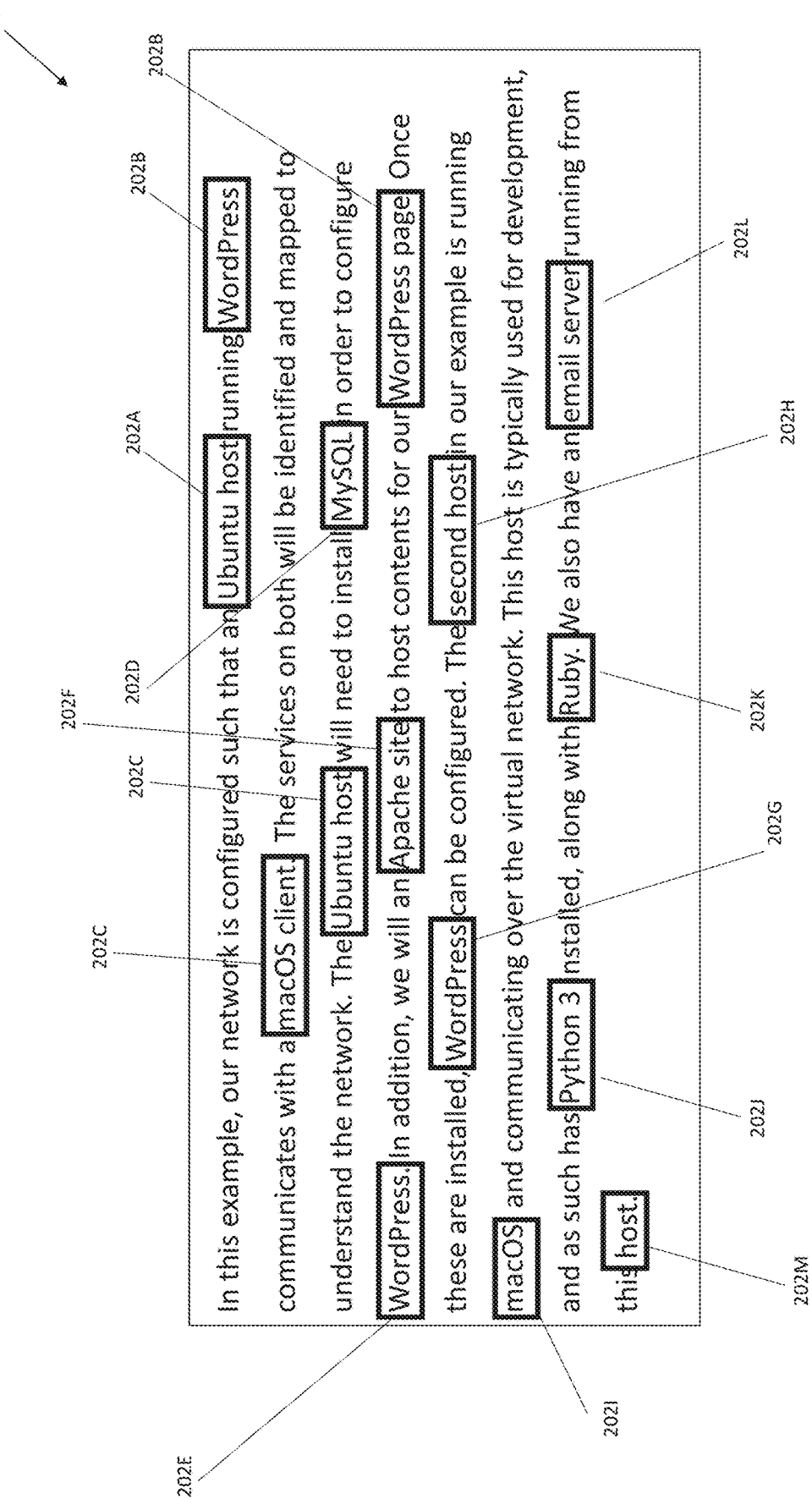
FIG. 2 illustrates an exemplary textual description of a computing network according to one or more examples of the disclosure.

FIG. 2 illustrates an exemplary textual description of a computing network according to one or more examples of the disclosure. In one or more examples, the textual description 200 of FIG. 2 can be obtained from any number of sources including but not limited to open-source/publically available web sites and blogs, physical and/or electronic documents, and image files. In one or more example, the textual description 200 of FIG. 2 can provide information concerning a network that as described below can be used to build an operational replica of a network.

In one or more examples, the textual description 200 in FIG. 2 can include one or more "entities" 202A-M. In one or more examples a network entity can refer to information about a computing host, operating systems, software applications, services, etc., that could be used to replicate a computing network. Additionally and/or optionally, an entity can also refer to a description of the relationship and context between the entities described above. For instance, in the example textual description 200 of FIG. 2, entity 202A can identify a type of host (i.e., Ubuntu), entity 202B can identify a software application, and entity 202C can identify an operating system. In one or more examples, the systems and methods described herein can use natural language processing techniques to identify the entities from a textual description. While identifying the entities in a textual description can yield partial information about how a computing network is configured, the information may not be enough to build an operational replica of the computing network. Thus, in one or more examples and as described below, the information extracted from a textual document can be enriched with additional information that can then allow for a replica to be created.

As discussed above, a textual or even graphical description of a computing network can provide at least some base information about the computing the network that can be used to create an operational replica of the target computing network. However, extracting that information in an efficient manner can be challenging. In one or more examples, the information about a network relevant to recreating the network could be "buried" within dense technical documents such that a human would be required to expend a significant amount of time and effort to extract the information needed to build a model of the network. Additionally, the information may be spread across multiple voluminous sources requiring significant human time and effort to extract the information that would be relevant.

Additionally, the partial information provided by the open-source intelligence by itself may not be adequate to build a meaningful replica of the target computing network for the purpose of developing attack vectors or understanding the network's vulnerabilities. Thus, the information extracted from public sources may need to be enriched in order to provide a complete enough picture of the computing network for the purposes of building an operational model of the target network. However, the information needed to enrich the information extracted from open sources may be complex, be found across disparate and numerous sources, and thus would it would be infeasible for a human analyst to enrich manually. Thus, in order to facilitate replication of computing networks from open-source or other textual/graphical descriptions of a computing network, a process that can not only extract the information from the open source components, but automatically enrich the information based on the extracted information can make a process that would otherwise be infeasible as being too complex for the human mind, possible.

Figure 3:
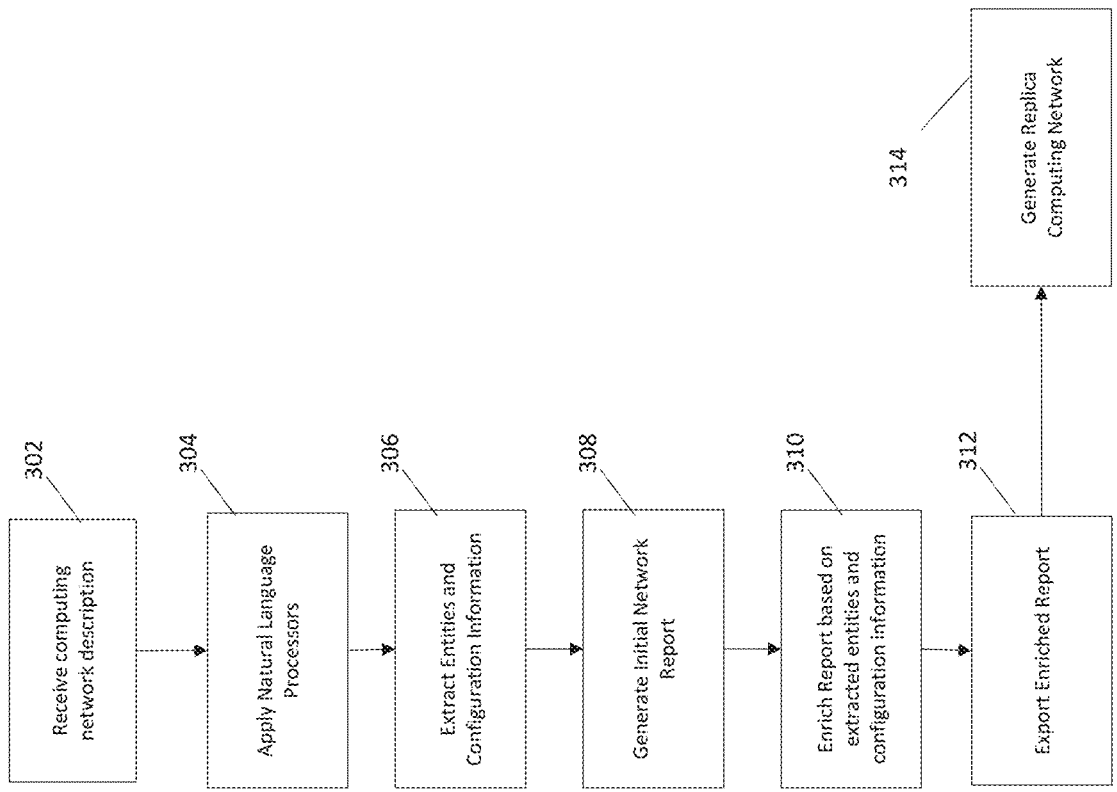
FIG. 3 illustrates an exemplary process for replicating a computing network from a natural language description of the computing network according to examples of the disclosure.

FIG. 3 illustrates an exemplary process for replicating a computing network from a natural language description of the computing network according to examples of the disclosure. In one or more examples, the process 300 of FIG. 3 can be used to generate a replica of a target computing network based on one or more textual/graphical descriptions of the network that can be found in various sources. In one or more examples, the process 300 can begin at step 302 wherein a network description is received. In one or more examples, the network description can be received in various electronic formats include as part of a website (i.e., hyper-text markup language (HTML) file), a portable document file (PDF), and/or a word processing file or any other computer-readable format. In one or more examples, the network description can also be in the form of an image file such as a jpeg or gif file.

In one or more examples, receiving a description of the network at step 302 can include converting one of the files described above into a common textual format (that is computer-readable) for the purposes of analysis by one or more natural language processor (described in detail below). In one or more examples, the graphical representations described above can be scanned using an optical character recognition program to extract textual descriptions found within the image files. In one or more examples, the common textual format can be configured to act as an input to a natural language processor (described in further detail below), such that the natural language processor can extract one or more entities and other information from the textual description.

In one or more examples, once the textual description has been received at step 302, the process 300 can move to step 304 wherein one or more natural language processors are applied to the textual description (that has been formatted in a manner that can be processed by the one or more natural language processors.) In one or more examples, a natural language processor can refer to a process/algorithm that can take a textual description at its input, and process the description to extract one or more features from the text. In one or more examples, and in the context of replicating a target network, in one or more examples, a natural language processor can extract information that may be pertinent to recreating a target network. For instance, in one or more examples, one or more natural language processors can be applied to the textual description received at step 302 so as to extract one or more computing/network entities that are mentioned in the received text. In one or more examples a network entity can refer to information about a computing host, operating systems, software applications, services, etc., that could be used to replicate a computing network. Additionally and/or optionally, an entity can also refer to a description of the relationship and context between the entities described above.

In one or more examples, the natural language processors can include one or more named entity recognition natural language processors. In one or more examples, a named entity recognition natural language processor can be configured to extract one or more named entities from the textual description received at step 302. In one or more example a named-entity recognition (NER) natural language processor that is configured to locate and classify named entities in a textual description into one or more categories. In one or more examples, and specifically in the context of computing networks, a NER natural language processor can be configured to identify the presence of specifically named network entities such as hosts, operating systems, software applications, etc. In one or more examples, the NER natural language processors can be a priori trained to search for pre-determined phrases or names that coincide with a computing/network entity. In one or more examples, a NER natural language processor, rather than configured to search for a given name or phrase, can also be configured to classify specific entities from a textual description. Thus, in one or more examples, rather than searching for specific names, an NER processor can be configured to identify when a particular set of text is referring to a specific type of entity. In the context of computing networks, an NER processor can be configured to search for mentions of operating systems, hosts, software applications, etc., which may be relevant to recreating a target computing network. Thus, in one or more examples, the NER processor can be configured to not only identify words or phrases which refer to pre-defined entities, but can also identify/classify the type of entity that is being named (i.e., operating system, host, application, etc.)

As described above, a NER processor can be utilized in situations where a particular name of an entity may have multiple meanings or ambiguous meanings, and thus the NER processor can be trained to not only identify an entity in the textual description, but also classify the entity according to what type of entity it is. In one or more examples, an NER processor can be generated using a supervised machine model in which the model is trained with training text that has been annotated to identify named entities and the type of entity that is found in the training text. Using these training examples, the NER processor can then utilize the machine learning model to identify other named entities in a textual description and classify them.

In one or more examples, the one or more natural language processors can include one or more pattern recognition processors that are configured to search and/or identify one or more pre-determined patterns within a text. In one or more examples, a pattern recognition processor can be configured to search for a pre-determined pattern within the textual description that are known (from a historical perspective) to be describing an entity that is relevant to replicating a target computing network. As an example, if a textual description is describing a target system, and specifically describing its specification, it might specify the amount of memory on a host system in gigabytes by applying a "GB" after a number. Thus, in one or more examples, a pattern recognition processor may be configured to identify instances in which a number followed by a "GB" appears in a textual description received at step 302. In one or more examples, the natural language processors described above (i.e., NER and pattern recognition) can be implemented using a software library specifically configured to perform natural language processing such as spaCy or similar software library.

In one or more examples, once the natural language processors have been applied to the received textual description at step 304, the process 300 can move to step 306 wherein the entities and classifications (as well as configuration information about those entities) identified by the natural language processors can be extracted. In one or more examples, extracting the one or more entities and/or configuration information can refer to generating a list of the identified entities as well as the classifications of the types of identified entities. In one or more examples, the list of identified entities and classification of those entities can be used to generate a preliminary network report, which ultimately can be enriched (as further described below) to generate a complete report that can be used to generate a replica of the target computing network.

In one or more examples, once the one or more entities/configuration information are extracted from the textual description at step 306, the process 300 can move to step 308 wherein an initial network report is generated. In one or more examples, a network report can include a listing of each of the entities extracted at step 306, where in the text the extracted entities are found, and any classifications that have been applied to the extracted entities. The initial network report can provide a partial or incomplete snapshot of the entities that comprise the target network, but by itself may not contain sufficient information to create an operational replica of the target network. Thus, in one or more examples, the initial network report generated at step 308 may need to be enriched with additional information (not found in the textual description) that can allow for the target network to be replicated. In one or more examples, the information needed to enrich the initial network report created at step 308 can be derived from many different sources. The information used to enrich the initial report can be dependent on the information that is already present in the initial report. Thus, in order to enrich the report, a human analyst would need to review each of the entities included in the initial report and draw upon numerous knowledge bases to create inferences about other entities not found in the textual description but that are likely to exist in the target computing system. Thus, the enrichment of the report is not something that can be practically done in the human mind because it requires drawing upon numerous sources for information about relationships between entities, such that additional entities can be placed into the report so as to build a complete picture of the target computing network. An automated process, one in which the report is enriched automatically, thus would ensure a quicker and more thorough process for enriching the report to a level that would enable the replication of the target network.

Figure 4:
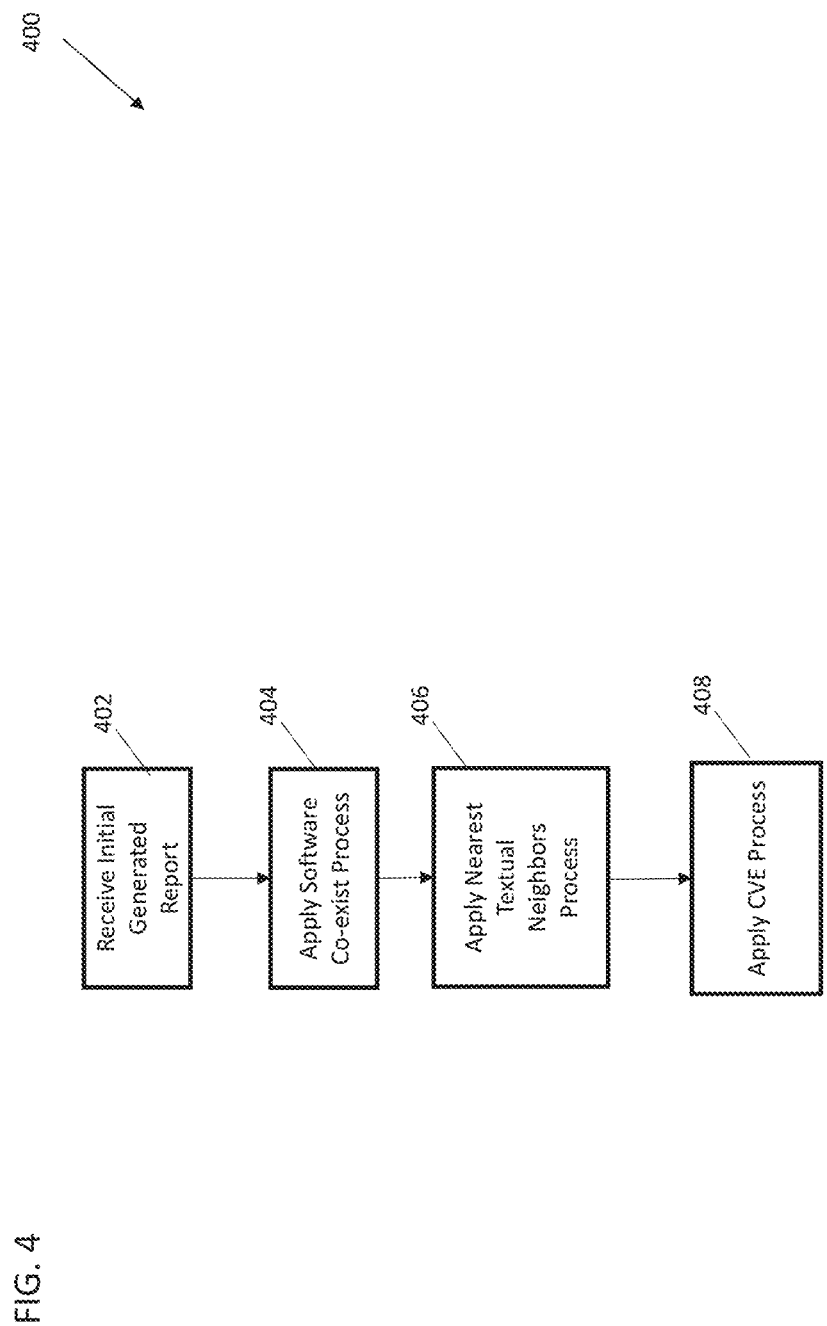
FIG. 4 illustrates an exemplary process for enriching an initial computer network report according to examples of the disclosure.

FIG. 4 illustrates an exemplary process for enriching an initial computer network report according to examples of the disclosure. In one or more examples, the process 400 of FIG. 4 can include one or more sub-processes that are applied to the initial report generated at step 308 of process 300. The process 400 depicted at FIG. 4 can represent the process used at step 310 to enrich the initial network report. In one or more examples, the enrichment process 400 can begin at step 402 wherein the initial report generated at step 308 is received. In one or more examples, the enrichment process 400 can include three separate processes. In one or more examples, at step 404, a software co-exist process (described in further detail below) can be applied to the initial report to determine any software applications that are associated with the entities named in the initial report.

Figure 5:
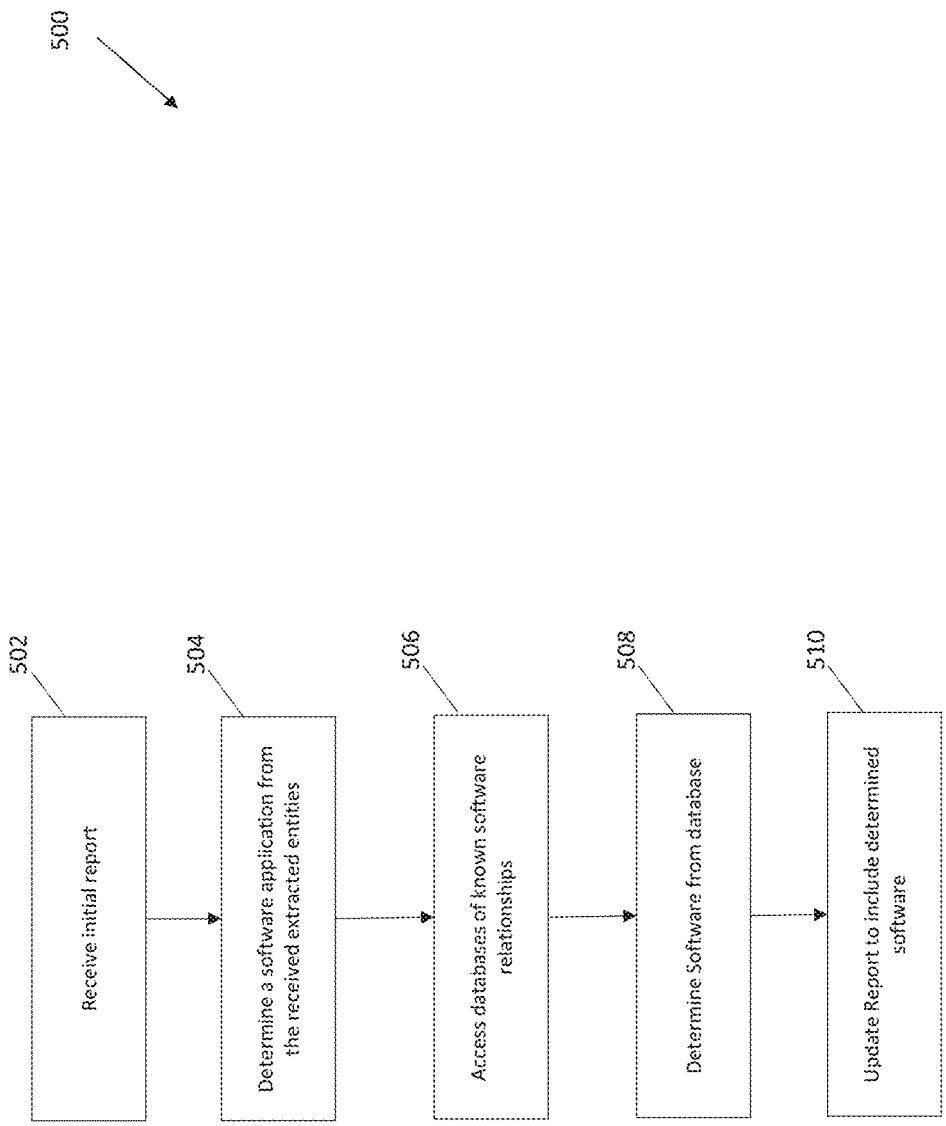
FIG. 5 illustrates an exemplary process for performing a software co-exist analysis according to examples of the disclosure.

FIG. 5 illustrates an exemplary process for performing a software co-exist analysis according to examples of the disclosure. In one or more examples, the process 500 of FIG. 5 can illustrate an exemplary process for performing step 404 of process 400 described above with respect to FIG. 4. In one or more examples, the process 500 of FIG. 5 can be configured to identify one or more software entities for inclusion in the report, based on a previously identified entity either extracted from the textual description or identified using some other process. In one or more examples, it may be known that certain software applications must co-exist meaning that if one software application is present on the computing network, then another separate hardware application must also exist on the network. Knowledge of which software applications co-exist with other applications can be based on history and prior knowledge of computing systems.

In one or more examples, the process 500 of FIG. 5 can begin at step 502 wherein the initial report generated at step 308 is received. In one or more examples, once the report is received at step 502, the process 500 can move to step 504 wherein the report can be analyzed to determine the presence of a software application entity within the report. As discussed above, the natural language process can be configured to not only identify the presence of an entity with the textual description of the computing network, but can also be configured to classify the entity according to what type of computing network entity it is. These classifications can include identifying which of the extracted entities are classified as software applications. At step 504, the initial report can be analyzed to determine the software applications that are present within the initial report.

In one or more examples, once the software applications have been identified at step 504, the process 500 can move to step 506 wherein the process establishes access to a one or more databases that contain known software relationships. In one or more examples, the database can be in the form of a lookup table in which various software applications are listed along with other software applications (including version numbers) that are known to co-exist with the software application. Thus, in one or more examples, if a specific software application entity is extracted from the textual description, then the database can be accessed to determine if there are any other software applications (or even versions of the extracted software entity) that is known to co-exist with the software application and thus is likely to also be part of the target computing network. In one or more examples, multiple databases can be accessed as the information of known software relationships may be voluminous and thus stored across multiple separate databases. Additionally or alternatively, one or more machine learning models can be employed to determine software relationships. In one or more examples, the one or more machine learning models can utilize one or more algorithms to generate the model including but not limited to clustering, linear models, neural networks, etc. In one or more examples, the one or more machine learning models. In one or more examples, the machine learning model can take a software application mentioned in the textual description at its input, and output likely co-existing software. In one or more examples, the output of the machine learning models can include a confidence score that tells the system how likely a particular software application is to co-exist with the input software application.

In one or more examples, once the database has been accessed at step 506, the process 500 moves to step 508 wherein a determination is made as to what software is likely to also be a part of the target computing network. In one or more examples, once software identified at step 508 are added at step 510 to the report received at step 502. Thus, in one or more examples, at the conclusion of process 500, the report received at step 502 can have been "enriched" with additional software applications that based on knowledge of prior relationships are known to also be a part of computing networks that contain the software entities identified in the report received at step 502.

Returning to the example of FIG. 4, in one or more examples, at step 406, a nearest textual neighbors process can be applied to the initial report so as to identify entities in the textual description that are close to one another in the text that an inference can be drawn that the two entities have a relationship to one another that should be reflected in the report that will ultimately be used to replicate the target network. As an example, if a software application is mentioned in the textual description, and a version number is also mentioned in the textual description, and the two mentions are proximate to one another (for instance separated by only a few words) then an inference can be drawn that the version number mentioned in the textual description likely corresponds to the software application mentioned proximately to the version number in the textual description. In one or more examples, and as another example of how a textual nearest neighbors process can be used to enrich a network report, if a software application is mentioned, then the textual nearest neighbors process can be applied to determine if the operating system or host that the software application is implemented on is mentioned earlier in the document. The above inference can assume that the operating system or host that the mentioned software application is implemented on would have been described prior to the software application being mentioned in the textual description.

In one or more examples, at step 408, a common vulnerability enumeration (CVE) process can be applied to the initial report. In one or more examples, a CVE process can include analyzing the entities in the report to determine any vulnerabilities with the entities in the report. In one or more examples, a CVE analysis of the entities in the report can yield information about the common or possible vulnerabilities one might expect to see on a specific host that is known to be running the software (and software versions) mentioned in the textual description. In one or more examples, the CVE information can be used to infer various software, hardware, configuration, etc., information about the network and can also be useful for attack path analysis used in subsequent analyses of the network once it has been replicated.

Returning to the example of FIG. 3, once the initial network report has been enriched at step 310, the process 300 can move to step 312 wherein the enriched report can be exported to one or more applications for further processing. As described in detail above, the enriched report can be exported to a tool that can ingest the report and build a replica and operational computing network that is configured to emulate the target network described in the computing network description received at step 302 of process 300. Additionally or alternatively, the enriched report can be exported to an analysis tool that can be configured to determine one or more attack paths/vulnerabilities of the computing network. In one or more examples, exporting the enriched report can include converting the enriched report into a format that is compatible with the tool that it is being exported to. Once the report has been exported at step 312, in one or more examples, the process 300 can move to step 314 wherein a replica computing network can be built using the enriched report. In one or more examples, building a replica computing network at step 314 can include instantiating a cloud-based computing network that includes the entities included in the enriched report and that reflects the relationships between the entities determined through the process 300 of FIG. 3

Figure 6:
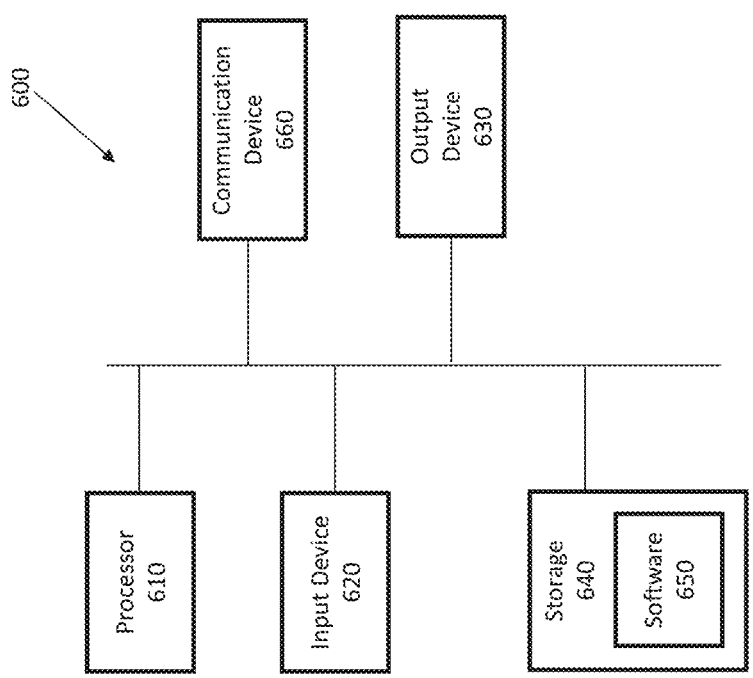
FIG. 6 illustrates an example of a computing device in accordance with one or more examples of the disclosure.

FIG. 6 illustrates an example of a computing device in accordance with one embodiment. Device 600 can be a host computer connected to a network. Device 600 can be a client computer or a server. As shown in FIG. 6, device 600 can be any suitable type of microprocessor-based device, such as a personal computer, workstation, server, or handheld computing device (portable electronic device) such as a phone or tablet. The device can include, for example, one or more of processor 610, input device 620, output device 630, storage 640, and communication device 660. Input device 620 and output device 630 can generally correspond to those described above and can either be connectable or integrated with the computer.

Input device 620 can be any suitable device that provides input, such as a touch screen, keyboard or keypad, mouse, or voice-recognition device. Output device 630 can be any suitable device that provides output, such as a touch screen, haptics device, or speaker.

Storage 640 can be any suitable device that provides storage, such as an electrical, magnetic, or optical memory, including a RAM, cache, hard drive, or removable storage disk. Communication device 660 can include any suitable device capable of transmitting and receiving signals over a network, such as a network interface chip or device. The components of the computer can be connected in any suitable manner, such as via a physical bus or wirelessly.

Software 650, which can be stored in storage 640 and executed by processor 610, can include, for example, the programming that embodies the functionality of the present disclosure (e.g., as embodied in the devices as described above).

Software 650 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 600 can implement any operating system suitable for operating on the network. Software 650 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification, because this disclosure can be practiced throughout the disclosed numerical ranges.

The above description is presented to enable a person skilled in the art to make and use the disclosure, and it is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. Finally, the entire disclosure of the patents and publications referred in this application are hereby incorporated herein by reference.

According to one or more examples of the disclosure, a method for generating a computing network based on natural language descriptions of the computing network comprises: receiving one or more textual descriptions of the computing network, wherein the received one or more descriptions of the computing network are formatted in a computer-readable format that is configured to enable natural language processing by the computing system, applying one or more natural language processors to the received one or more textual descriptions of the computing network, wherein the one or more natural language processors are configured to extract one or more network entities from the received one or more descriptions of the computing network, generating an network report based on the entities extracted by the one or more natural language processors, wherein the network report comprises the entities extracted by the one or more natural language processors, generating enrichment information, wherein the enrichment information is associated with the one or more entities extracted by one or more natural language processors, modifying the generated network report with the generated enrichment information, and generating the computing network based on the modified network report.

Optionally, the received one or more textual descriptions comprise one or more computer readable files chosen from a file format selected from the group consisting of: a Hyper-Text Markup Language (HTML) file, a portable document file (PDF), and a word processing file.

Optionally the one or more natural language processors comprises a named entity recognition natural language processor, wherein the named entity recognition natural language processor is configured to extract the one or more network entities from the one or more descriptions.

Optionally the named entity recognition natural language processor is implemented as a machine learning model.

Optionally the named entity recognition natural language processors is implemented as a supervised deep learning model.

Optionally the one or more natural language processors are configured to identify one or more patterns within the converted one or more descriptions.

Optionally the one or more network entities comprise a first software application, and wherein generating enrichment information includes determining one or more additional software applications that are known to co-exist with the first software application.

Optionally determining one or more additional software applications that are known to co-exist with the first software application comprises accessing one or more databases, wherein the one or more databases comprise information about software applications that are known to co-exist with one another.

Optionally determining one or more additional software that are known to co-exist with the first software application comprises applying one or more machine learning models.

Optionally generating enrichment information comprises applying a textual nearest neighbors process to the received one or more textual descriptions of the computing network.

Optionally generating enrichment information comprises determining one or more vulnerabilities associated with the entities of the generated network report.

According to one or more examples, a system for generating a computing network based on natural language descriptions of the computing network comprises: a memory, one or more processors, wherein the memory stores one or more programs that when executed by the one or more processors, cause the one or more processors to: receive one or more textual descriptions of the computing network, wherein the received one or more descriptions of the computing network are formatted in a computer-readable format that is configured to enable natural language processing by the computing system, apply one or more natural language processors to the received one or more textual descriptions of the computing network, wherein the one or more natural language processors are configured to extract one or more network entities from the received one or more descriptions of the computing network, generate a network report based on the entities extracted by the one or more natural language processors, wherein the network report comprises the entities extracted by the one or more natural language processors, generate enrichment information, wherein the enrichment information is associated with the one or more entities extracted by one or more natural language processors; modify the generated network report with the generated enrichment information, and generate the computing network based on the modified network report.

According to one or more examples, a non-transitory computer readable storage medium storing one or more programs for generating a computing network based on natural language descriptions of the computing network, the programs for execution by one or more processors of an electronic device that when executed by the device, cause the device to: receive one or more textual descriptions of the computing network, wherein the received one or more descriptions of the computing network are formatted in a computer-readable format that is configured to enable natural language processing by the computing system, apply one or more natural language processors to the received one or more textual descriptions of the computing network, wherein the one or more natural language processors are configured to extract one or more network entities from the received one or more descriptions of the computing network, generate an network report based on the entities extracted by the one or more natural language processors, wherein the network report comprises the entities extracted by the one or more natural language processors, generate enrichment information, wherein the enrichment information is associated with the one or more entities extracted by one or more natural language processors, modify the generated network report with the generated enrichment information, and generate the computing network based on the modified network report.

What is claimed is:

1. A method for generating a computing network based on natural language descriptions of the computing network, the method comprising:
   receiving one or more textual descriptions of the computing network, wherein the received one or more descriptions of the computing network are formatted in a computer-readable format that is configured to enable natural language processing by the computing system;
   applying one or more natural language processors to the received one or more textual descriptions of the computing network, wherein the one or more natural language processors are configured to extract one or more network entities from the received one or more descriptions of the computing network;
   generate a network report based on the entities extracted by the one or more natural language processors, wherein the network report comprises the entities extracted by the one or more natural language processors;
   generating enrichment information, wherein the enrichment information is associated with the one or more entities extracted by one or more natural language processors;
   modifying the generated network report with the generated enrichment information; and
   generating the computing network based on the modified network report.

2. The method of claim 1, wherein the received one or more textual descriptions comprise one or more computer readable files chosen from a file format selected from the group consisting of: a Hyper-Text Markup Language (HTML) file, a portable document file (PDF), and a word processing file.

3. The method of claim 1, wherein the one or more natural language processors comprises a named entity recognition natural language processor, wherein the named entity recognition natural language processor is configured to extract the one or more network entities from the one or more descriptions.

4. The method of claim 3, wherein the named entity recognition natural language processor is implemented as a machine learning model.

5. The method of claim 4, wherein the named entity recognition natural language processors is implemented as a supervised deep learning model.

6. The method of claim 1, wherein the one or more natural language processors are configured to identify one or more patterns within the converted one or more descriptions.

7. The method of claim 1, wherein the one or more network entities comprise a first software application, and wherein generating enrichment information includes determining one or more additional software applications that are known to co-exist with the first software application.

8. The method of claim 7, wherein determining one or more additional software applications that are known to co-exist with the first software application comprises accessing one or more databases, wherein the one or more databases comprise information about software applications that are known to co-exist with one another.

9. The method of claim 7, wherein determining one or more additional software that are known to co-exist with the first software application comprises applying one or more machine learning models.

10. The method of claim 1, wherein generating enrichment information comprises applying a textual nearest neighbors process to the received one or more textual descriptions of the computing network.

11. The method of claim 1, wherein generating enrichment information comprises determining one or more vulnerabilities associated with the entities of the generated network report.

12. A system for generating a computing network based on natural language descriptions of the computing network, the system comprising:
   a memory;
   one or more processors;
   wherein the memory stores one or more programs that when executed by the one or more processors, cause the one or more processors to:
      receive one or more textual descriptions of the computing network, wherein the received one or more descriptions of the computing network are formatted in a computer-readable format that is configured to enable natural language processing by the computing system;
      apply one or more natural language processors to the received one or more textual descriptions of the computing network, wherein the one or more natural language processors are configured to extract one or more network entities from the received one or more descriptions of the computing network;
      generate a network report based on the entities extracted by the one or more natural language processors, wherein the network report comprises the entities extracted by the one or more natural language processors;

generate enrichment information, wherein the enrichment information is associated with the one or more entities extracted by one or more natural language processors;

modify the generated network report with the generated enrichment information; and generate the computing network based on the modified network report.

13. The system of claim 12, wherein the received one or more textual descriptions comprise one or more computer readable files chosen from a file format selected from the group consisting of: a Hyper-Text Markup Language (HTML) file, a portable document file (PDF), and a word processing file.

14. The system of claim 12, wherein the one or more natural language processors comprises a named entity recognition natural language processor, wherein the named entity recognition natural language processor is configured to extract the one or more network entities from the one or more descriptions.

15. The system of claim 14, wherein the named entity recognition natural language processor is implemented as a machine learning model.

16. The system of claim 15, wherein the named entity recognition natural language processors is implemented as a supervised deep learning model.

17. The system of claim 12, wherein the one or more natural language processors are configured to identify one or more patterns within the converted one or more descriptions.

18. The system of claim 12, wherein the one or more network entities comprise a first software application, and wherein generating enrichment information includes determining one or more additional software applications that are known to co-exist with the first software application.

19. The system of claim 18, wherein determining one or more additional software applications that are known to co-exist with the first software application comprises accessing one or more databases, wherein the one or more databases comprise information about software applications that are known to co-exist with one another.

20. The system of claim 18, wherein determining one or more additional software that are known to co-exist with the first software application comprises applying one or more machine learning models.

21. The system of claim 12, wherein generating enrichment information comprises applying a textual nearest neighbors process to the received one or more textual descriptions of the computing network.

22. The system of claim 12, wherein generating enrichment information comprises determining one or more vulnerabilities associated with the entities of the generated network report.

23. A non-transitory computer readable storage medium storing one or more programs for generating a computing network based on natural language descriptions of the computing network, the programs for execution by one or more processors of an electronic device that when executed by the device, cause the device to:

receive one or more textual descriptions of the computing network, wherein the received one or more descriptions of the computing network are formatted in a computer-readable format that is configured to enable natural language processing by the computing system;

apply one or more natural language processors to the received one or more textual descriptions of the computing network, wherein the one or more natural language processors are configured to extract one or more network entities from the received one or more descriptions of the computing network;

generate a network report based on the entities extracted by the one or more natural language processors, wherein the network report comprises the entities extracted by the one or more natural language processors;

generate enrichment information, wherein the enrichment information is associated with the one or more entities extracted by one or more natural language processors;

modify the generated network report with the generated enrichment information; and generate the computing network based on the modified network report.

24. The non-transitory computer readable storage medium of claim 23, wherein the received one or more textual descriptions comprise one or more computer readable files chosen from a file format selected from the group consisting of: a Hyper-Text Markup Language (HTML) file, a portable document file (PDF), and a word processing file.

25. The non-transitory computer readable storage medium of claim 23, wherein the one or more natural language processors comprises a named entity recognition natural language processor, wherein the named entity recognition natural language processor is configured to extract the one or more network entities from the one or more descriptions.

26. The non-transitory computer readable storage medium of claim 25, wherein the named entity recognition natural language processor is implemented as a machine learning model.

27. The non-transitory computer readable storage medium of claim 26, wherein the named entity recognition natural language processors is implemented as a supervised deep learning model.

28. The non-transitory computer readable storage medium of claim 23, wherein the one or more natural language processors are configured to identify one or more patterns within the converted one or more descriptions.

29. The non-transitory computer readable storage medium of claim 23, wherein the one or more network entities comprise a first software application, and wherein generating enrichment information includes determining one or more additional software applications that are known to co-exist with the first software application.

30. The non-transitory computer readable storage medium of claim 29, wherein determining one or more additional software applications that are known to co-exist with the first software application comprises accessing one or more databases, wherein the one or more databases comprise information about software applications that are known to co-exist with one another.

31. The method of claim 29, wherein determining one or more additional software that are known to co-exist with the first software application comprises applying one or more machine learning models.

32. The non-transitory computer readable storage medium of claim 23, wherein generating enrichment information comprises applying a textual nearest neighbors process to the received one or more textual descriptions of the computing network.

33. The non-transitory computer readable storage medium of claim 23, wherein generating enrichment information comprises determining one or more vulnerabilities associated with the entities of the generated network report.

* * * * *